Sept. 27, 1938.  K. CLARK  2,131,094
SAFETY DEVICE
Filed July 12, 1937
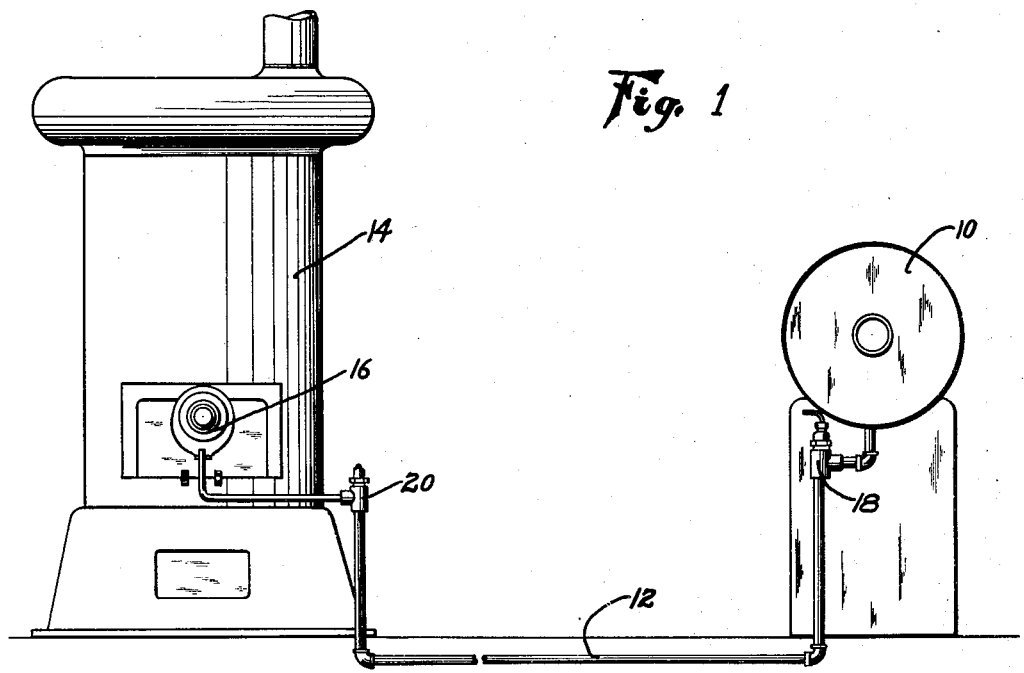
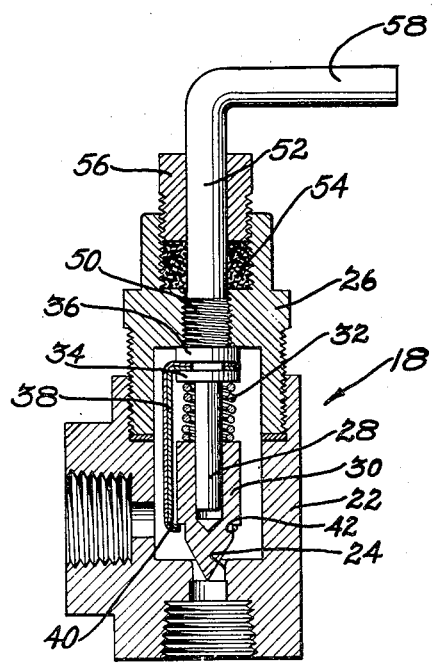
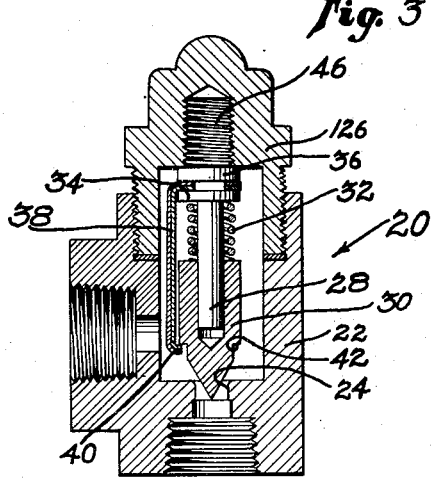
INVENTOR
KENDALL CLARK
BY McConkey & Booth
ATTORNEYS Patented Sept. 27, 1938

2,131,094

UNITED STATES PATENT OFFICE 2,131,094

SAFETY DEVICE

Kendall Clark, South Bend, Ind., assignor to International Engineering Corporation, Chicago, Ill., a corporation of Illinois Application July 12, 1937, Serial No. 153,217

11 Claims. (Cl. 137—161)

This invention relates to safety devices such as automatic shut-off valves for the fuel line of an oil burner or the like. An object is to provide a simple but reliable and effective device for shutting off a feed line automatically when subjected to excessive heat.

In one desirable arrangement, the device includes a valve plunger or the equivalent which is held in open position by a bimetallic latch, the latch being deflected by excessive heat to release the plunger, which is thereupon automatically seated by a suitable spring.

Various features of novelty relate to the construction and operation of the parts, to the assembly of the working parts for removal as a unit, to the provision of means facilitating re-latching the valve in open position again when cool, and to other novel combinations and desirable arrangements which will be apparent from the following description of the illustrative heating system shown in the accompanying drawing, in which:

Figure 1 is an elevational view showing somewhat diagrammatically the heating plant and the fuel tank and the fuel line between them with one of my novel safety valve devices at each end thereof.

Figure 2 is a section through the valve at the fuel-tank end of the line; and

Figure 3 is a section through the valve at the burner end of the line.

The heating system illustrated in Figure 1 comprises a tank 10 for fuel oil, a fuel line 12 leading therefrom, and a heating plant including a suitable furnace 14 having an oil burner 16 receiving the fuel from the line 12. The particular burner 16 illustrated is fully described in my prior application No. 117,459 filed December 14, 1936; however, any desired form of burner may be used. The burner 16 illustrated includes a pump for drawing fuel through the line 12 from the tank 10.

Interposed in the line 12 adjacent the tank 10 is a novel automatic shut-off valve 18 shown in detail in Figure 2. Interposed in line 12 adjacent the burner 16 is a somewhat similar automatic shut-off valve 20 shown in detail in Figure 3. It is mainly with these valves that the present invention has to do.

The valve 18 includes a valve body 22, having at one side a valve seat 24, and having at its opposite side an opening alined with the valve seat and into which is detachably threaded a removable plug 26.

The plug 26 carries a guide pin 28, on which is axially slidable a valve plunger 30 urged against the valve seat 24 by a coil spring 32 surrounding the pin 28 and compressed between the base of the plunger and a washer 34 mounted on the pin 28. The pin 28 is formed with a flange 36, seated against the plug 26 when the valve is fully open, against which the washer 34 holds the perforated end of a latch 38. The opening in the end of the latch 38 encircles the pin 28 just below the flange 36.

The latch 38 is bent at right angles to parallel the pin 28, and its lower end is bent at 40 to hook under an annular flange formed on the plunger 30 and facing toward the valve seat 24. The latch 38 is of bimetallic material. Normally it holds the plunger 30 off the seat 24, but under the influence of excessive heat it automatically deflects to release the valve plunger 30, whereupon the spring 32 forces the plunger against the seat 24 to shut off the flow of fuel.

As so far described, the two valves may be, and are shown as being of the same construction, except that the plug 126 of the valve 18 is in the form of a closed cap having a socket into which the upper end 46 of the guide pin 28 is permanently threaded or otherwise secured.

The plug 26 of the valve 18 is formed with a threaded opening receiving a correspondingly threaded portion 50 of its guide pin 28, beyond which is an extension 52 passing through a packing 54 held by a gland nut 56 and then bent laterally to form a handle 58.

In operation, after the valve 20 has automatically shut off because of excessive heat, when it has cooled off it is necessary to remove the unit comprising the plug 126, the pin 28, the plunger 30, and the latch 38, whereupon the plunger 30 can be pushed back up the pin 28 to re-set the latch, and the unit re-inserted in the valve body 22.

The valve 18, however, can be re-set by turning the handle 58 to shift the pin 28 carrying the latch 38 downwardly until the latch re-engages, and then turning the handle 58 in the opposite direction until the flange 36 engages the plug 26.

In addition to the above features, the valve can be used as a manual shut-off valve by turning handle 58 to force needle 30 tightly against seat 24 through the action of screw 50.

While two embodiments have been described in detail, it is not my intention to limit the scope of the invention to those particular embodiments, or otherwise than by the terms of the appended claims.

I claim:

1. A safety device comprising a valve body formed with a seat, a spring-pressed valve member urged toward said seat to close the valve, a bi-metallic latch holding said valve member unseated and adapted to be distorted by excessive heat in a direction to unlatch said valve member to allow it to seat itself, and a plug threaded into the valve body and having a part projecting toward said seat and which has slidable guiding engagement with the valve member, said latch being secured at one end adjacent the junction between the plug and said part.

2. A safety device comprising a valve body formed with a seat, a valve plunger having a spring by which it is urged toward said seat to close the valve, said plunger being formed with a latch shoulder, a bi-metallic latch fixed at one end and having its other end bent and hooked under said shoulder to hold said valve member unseated and which is adapted to be distorted by excessive heat in a direction to unlatch said valve plunger to allow it to be seated by said spring, means operable from outside the valve body for relatching the valve plunger, and a plug threaded into the valve body and carrying the valve plunger and the spring and the latch and said means.

3. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at one end to the plug and having at its other end a hook normally engaging said shoulder and which is adapted to be deflected by excessive heat to unlatch said plunger.

4. A valve comprising a valve body formed on one side with a valve seat and on its opposite side with a threaded opening, a plug threaded into said opening, a guide pin carried by said plug and alined with said seat, a valve plunger movably mounted on said pin and movable against said seat, a coil spring encircling said pin and confined between the base of the plunger and a shoulder associated with said pin and urging the plunger toward said seat, said plunger having a locking shoulder facing toward said seat, and a bi-metallic latch fixed at one end to said plug and having at its other end a hook normally engaging said shoulder and which is adapted to be deflected by excessive heat to unlatch said plunger.

5. A safety device comprising a valve body formed with a seat, a valve plunger having a spring by which it is urged toward said seat to close the valve, said plunger being formed with a latch shoulder, a bi-metallic latch fixed at one end and having its other end bent and hooked under said shoulder to hold said valve member unseated and which is adapted to be distorted by excessive heat in a direction to unlatch said valve plunger to allow it to be seated by said spring, said plunger having means operable from outside the valve for relatching the bi-metallic latch to the plunger when cool, and a plug removably mounted in the valve body and carrying the valve plunger and the spring and the latch and said means.

6. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at the end adjacent said plug and having at its other end a hook normally engaging said shoulder and which is adapted to be deflected by excessive heat to unlatch said plunger, said pin being operable from outside the valve to shift said latch to cause it to re-engage said shoulder when cool.

7. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at the end adjacent said plug and having at its other end a hook normally engaging said shoulder and which is adapted to be deflected by excessive heat to unlatch said plunger, said latch being mounted at its fixed end on said pin and the pin having a part projecting through the plug and operable to shift the latch to cause it to reengage said shoulder when cool.

8. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at the end adjacent said plug and having at its other end a hook normally engaging said shoulder and which is adapted to be deflected by excessive heat to unlatch said plunger, said latch being mounted at its fixed end on said pin and the pin having a part projecting through and threaded in the body of the plug and rotatable to move said pin lengthwise toward the valve seat to shift the latch to cause it to reengage said shoulder when cool.

9. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at the end adjacent said plug and having at its other end a hook normally engaging said shoulder and which is adapted to be deflected by excessive heat to unlatch said plunger, said plug and said pin and said plunger and said spring and said latch all forming a unit removable by detaching the plug from the valve body.

10. A valve comprising a valve body formed on one side with a valve seat and on its opposite side with an opening, a plug removably seated in said opening, a guide pin carried by said plug and alined with said seat, a valve plunger movably mounted on said pin and movable against said seat, a spring urging the plunger toward said seat, said plunger having a locking shoulder facing toward said seat, and a bi-metallic latch fixed at the end adjacent said plug and having at its other end a hook normally engaging said shoulder and which is adapted to be deflected by excessive heat to unlatch said plunger, said latch being mounted at its fixed end on said pin and the pin having a part projecting through and threaded in the body of the plug and rotatable to move said pin lengthwise toward the valve seat to shift the latch to cause it to reengage said shoulder when cool, said plug and said pin and said plunger and said spring and said latch all forming a unit removable by detaching the plug from the valve body.

11. A safety device forming a manual shut-off valve and comprising a valve body formed with a seat, a plunger having a spring by which it is urged toward said seat to close the valve, said plunger being formed with a latch shoulder, and a bimetallic latch fixed at one end and having its other end bent and hooked under said shoulder to hold said valve member unseated and which is adapted to be distorted by excessive heat in a direction to unlatch said valve plunger to allow it to be seated by said spring said plunger having a handle operable from outside the valve for relatching the bimetallic latch to the plunger when cool, and said handle also being operable to shift said plunger to manually open and close the valve from outside the valve while said bimetallic latch is in latching position.

KENDALL CLARK.